(12) United States Patent
Cho

(10) Patent No.: US 9,567,046 B2
(45) Date of Patent: Feb. 14, 2017

(54) BOAT HAVING BUOYANCY UNIT

(76) Inventor: Dong-Jin Cho, Seoul (KR)

(*) Notice: Subject to any disclaimer, the term of this patent is extended or adjusted under 35 U.S.C. 154(b) by 0 days.

(21) Appl. No.: 14/396,902

(22) PCT Filed: Jun. 29, 2012

(86) PCT No.: PCT/KR2012/005167
§ 371 (c)(1),
(2), (4) Date: Oct. 27, 2014

(87) PCT Pub. No.: WO2013/162120
PCT Pub. Date: Oct. 31, 2013

(65) Prior Publication Data
US 2015/0144045 A1 May 28, 2015

(30) Foreign Application Priority Data

Apr. 25, 2012 (KR) .................... 10-2012-0043183

(51) Int. Cl.
| | | |
|---|---|---|
| *B63B 39/03* | (2006.01) | |
| *B63B 43/12* | (2006.01) | |
| *B63B 3/02* | (2006.01) | |
| *B63B 3/26* | (2006.01) | |
| *B63B 3/38* | (2006.01) | |
| *B63B 1/32* | (2006.01) | |
| *B63B 13/00* | (2006.01) | |
| *B63B 43/06* | (2006.01) | |
| *B63B 35/14* | (2006.01) | |

(52) U.S. Cl.
CPC ................ *B63B 43/12* (2013.01); *B63B 1/32* (2013.01); *B63B 3/02* (2013.01); *B63B 3/26* (2013.01); *B63B 3/38* (2013.01); *B63B 13/00* (2013.01); *B63B 39/03* (2013.01); *B63B 43/06* (2013.01); *B63B 35/14* (2013.01); *Y02T 70/12* (2013.01)

(58) Field of Classification Search
CPC ............ B63B 43/06; B63B 43/12; B63B 1/20
USPC ........................................ 114/125
See application file for complete search history.

(56) References Cited

U.S. PATENT DOCUMENTS

| | | | | |
|---|---|---|---|---|
| 6,427,616 B1 * | 8/2002 | Hagen | ...................... | B63B 1/32 |
| | | | | 114/121 |
| 8,739,723 B1 * | 6/2014 | Murphy | .................. | B63B 39/03 |
| | | | | 114/125 |
| 2009/0293790 A1 * | 12/2009 | Bogard | ..................... | B63B 1/20 |
| | | | | 114/61.2 |

FOREIGN PATENT DOCUMENTS

| | | |
|---|---|---|
| JP | 07267179 | 10/1995 |
| JP | 08150990 | 6/1996 |
| KR | 2019990035530 | 9/1999 |
| KR | 200345316 | 3/2004 |
| KR | 1020120004570 | 1/2012 |

OTHER PUBLICATIONS

International Search Report—PCT/KR2012/005167 dated Dec. 3, 2012.

* cited by examiner

*Primary Examiner* — Stephen Avila
(74) *Attorney, Agent, or Firm* — Cantor Colburn LLP

(57) ABSTRACT

A boat includes: a pair of buoyancy units spaced from each other; a bottom plate structure connecting the bottoms of the pair of buoyancy units to each other; and a water storage defined by the pair of buoyancy units and the bottom plate structure, open rearward at the stern to take water from the outside, and keeping the water flowing therein. The boat can keep the balance more stable, is free from a common waterproof problem, and can improve a running ability.

17 Claims, 6 Drawing Sheets

BOAT HAVING BUOYANCY UNIT

TECHNICAL FIELD

The present invention relates to a boat having buoyancy unit which has excellent running ability, can keep balance stable, and can be free from a common waterproof problem.

BACKGROUND ART

In general, boats (ships) can be classified into a mono hull and a multi hull (typically, catamaran), depending on the number of hulls providing buoyancy.

Monohulls, ships with one hull providing buoyancy, has excellent traveling ability or running ability, but the center buoyancy is stable less than multi hulls, so they have a defect of too much roll that is an up-down swing of the sides by waves or wind and pitch that is an up-down swing of the bow and the stern. On the contrary, in multihulls, ships with two or more hulls providing buoyancy, particularly, as for catamarans that are typical ones, the center of buoyancy is divided to both sides, so the balance can be kept stable, but the running ability is poor in comparison to monohulls.

DISCLOSURE

Technical Problem

An object of the present invention is to provide a boat having a buoyancy unit that can keep the balance more stable, is free from a common waterproof problem, and can improve a running ability.

Technical Solution

According to the present invention, the object can be achieved by a boat including: a pair of buoyancy units spaced from each other; a bottom plate structure connecting the bottoms of the pair of buoyancy units to each other; and a water storage defined by the pair of buoyancy units and the bottom plate structure, open rearward at the stern to take water from the outside, and keeping the water flowing therein.

The water storage may be filled with water from the outside, when the boat stops, and the water in the water storage may be discharged outside when the boat travels.

The boat may further include a unilateral water shield that covers a portion of rear-open area of the water storage, and opens when the water in the water storage is discharged to the outside.

The bottom plate structure may have a structure declining toward the center at both sides.

The bottom plate may include a first bottom plate of which one end is coupled to the bottom of any one of the pair of buoyancy units and a second bottom plate of which one end is coupled to the bottom of the other one of the pair of buoyancy units, and the other end of the first bottom plate and the other end of the second bottom plate may be bent at the center of the bottom plate structure fastened to each other.

The boat may further include a keel plate disposed between the first bottom plate and the second bottom plate and extending from the bow to the stern of the boat.

The boat may further include a reinforcing frame that supports the bottom plate structure to the buoyancy units by connecting the buoyancy units and the bottom plate structure to each other, in the space defined between the buoyancy units and the bottom plate structure.

The reinforcing frame may include: a first reinforcing frame of which one end is coupled to the bottom of any one of the pair of buoyancy units and other end is coupled to the left part of the bottom plate structure; and a second reinforcing frame of which one end is coupled to the bottom of the other one of the pair of buoyancy units and the other end is coupled to the right part of the bottom plate structure.

In each of the first and second reinforcing frames, one end coupled to the buoyancy unit and the other end coupled to the bottom plate structure may be bent.

The first and second reinforcing frames may be each composed of a plurality of unit frames spaced from each other in the longitudinal direction of the boat.

The boat may further include at least one running frame that is coupled to the bottom of the bottom plate structure and improves a running ability by extending in the longitudinal direction of the boat. The running frame may have a ⊓-shaped cross-section.

The buoyancy unit may include: a reinforcing case having an internal space; and at least one tube disposed in the reinforcing case and pressing the inner side of the reinforcing case when a gas is injected.

The reinforcing case may be formed by combining a top plate, a left plate, a right plate, and a bottom plate. The top plate, the left plate, the right plate, and the bottom plate each may have fastening portions at both sides which are bent outward from the reinforcing case.

When a gas is not injected in the tube, the top plate may be substantially horizontally arranged and the bottom plate may be disposed at an angle downward toward the center of the boat.

The reinforcing case may deform in an outward convex shape by expanding with the tube, as a gas is injected into the tube.

The bottom plate structure may be coupled to the bottom of the reinforcing case, after the reinforcing case deforms in the outward convex shape.

The boat may further include a bow structure detachably combined with the pair of buoyancy units.

Advantageous Effects

According to the present invention, since the bottoms of the pair of buoyancy units spaced from each other are connected to each other by the bottom plate structure and the bottom plate structure forms the bottom of the boat in cooperation with the pair of buoyancy units, it is possible to keep the advantage of a multihull (catamaran) that the center of buoyancy is stable and to implement the structure of a monohull when the boat travels, so running ability can be improved.

Further, according to the present invention, since the water storage that is open rearward at the stern to take water from the outside and keep the water is defined by the pair of buoyancy units and the bottom plate structure, the balance keeps more stable. Accordingly, it is possible to reduce roll that is an up-down swing of the sides by waves or wind and pitch that is an up-down swing of the bow and the stern and the boat can be free from a common waterproof problem.

Further, according to the present invention, since the reinforcing frame supporting the bottom plate structure to the buoyancy units by connecting the buoyancy units and the bottom plate structure to each other is disposed in the space defined between the buoyancy units and the bottom plate structure, the structural strength of the bottom plate structure is enhanced so that the bottom plate structure repeats bending when the boat travels, so stability in traveling of the boat can be secured.

BEST MODE

Figure 1:
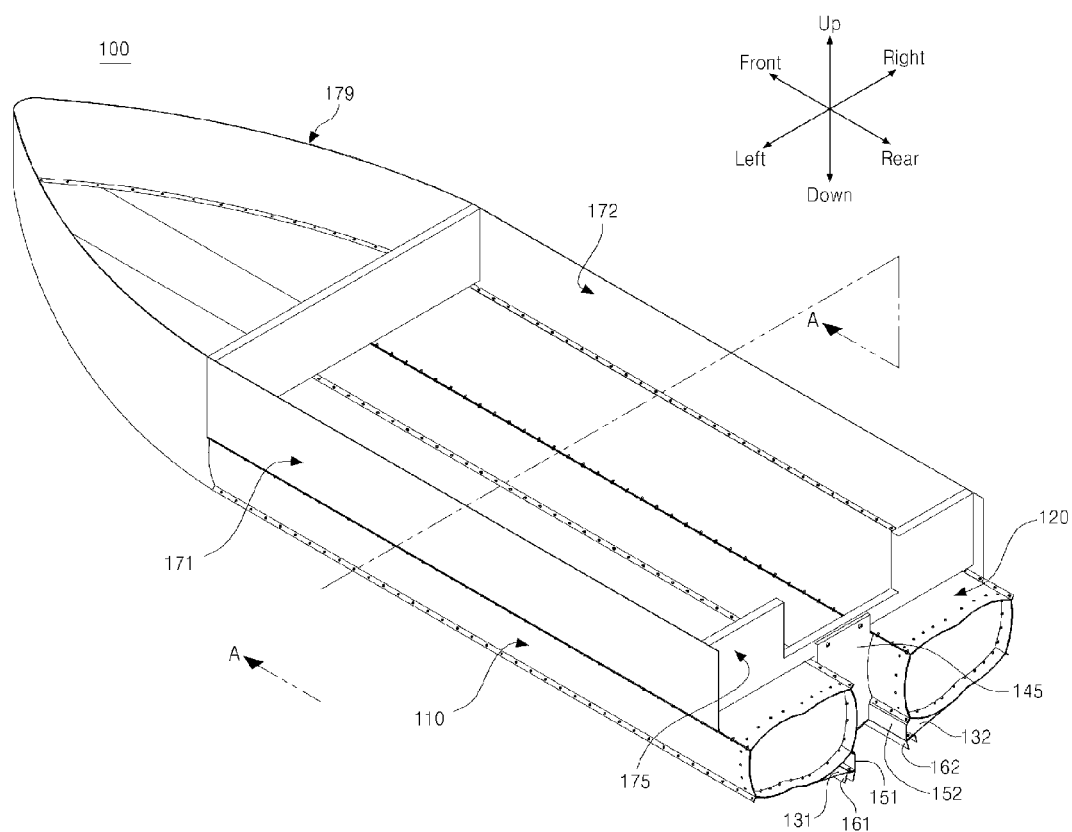
FIG. 1 is a perspective view illustrating a boat having a buoyancy unit according to an embodiment of the present invention.

It is necessary to refer to the accompanying drawings illustrating preferred embodiments of the present invention and those illustrated in the drawings in order to fully understand the present invention, operational advantages of the present invention, and objects accomplished by implementing the present invention.

The present invention is described hereafter in detail by explaining preferred embodiments of the present invention with reference to the accompanying drawings. In the following description of the present invention, well-known functions or configurations are not described to make the spirit of the present invention clear.

Figure 2:
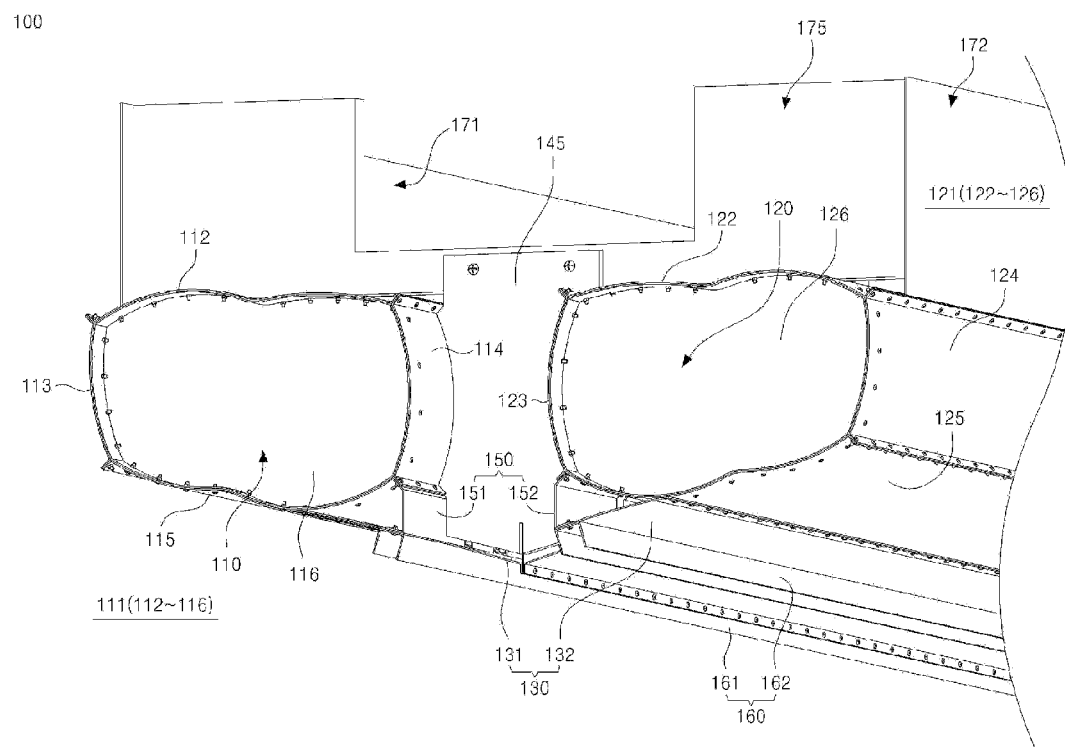
FIG. 2 is a partial perspective view of the boat of FIG. 1 shown in another direction.
Figure 3:
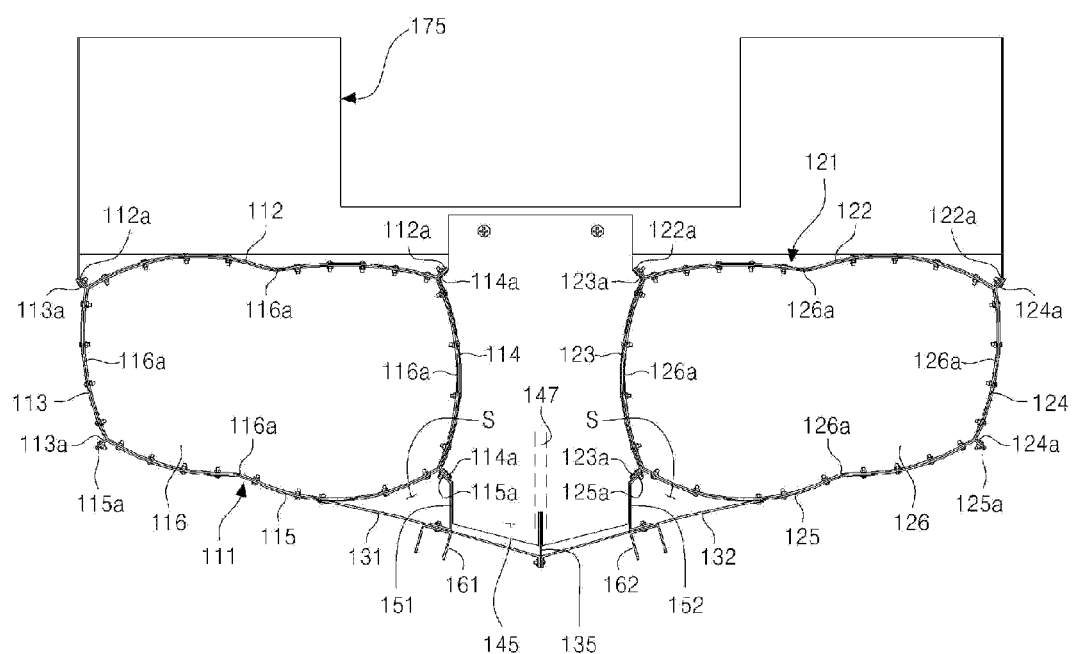
FIG. 3 is a rear view of the boat of FIG. 1.
Figure 4:
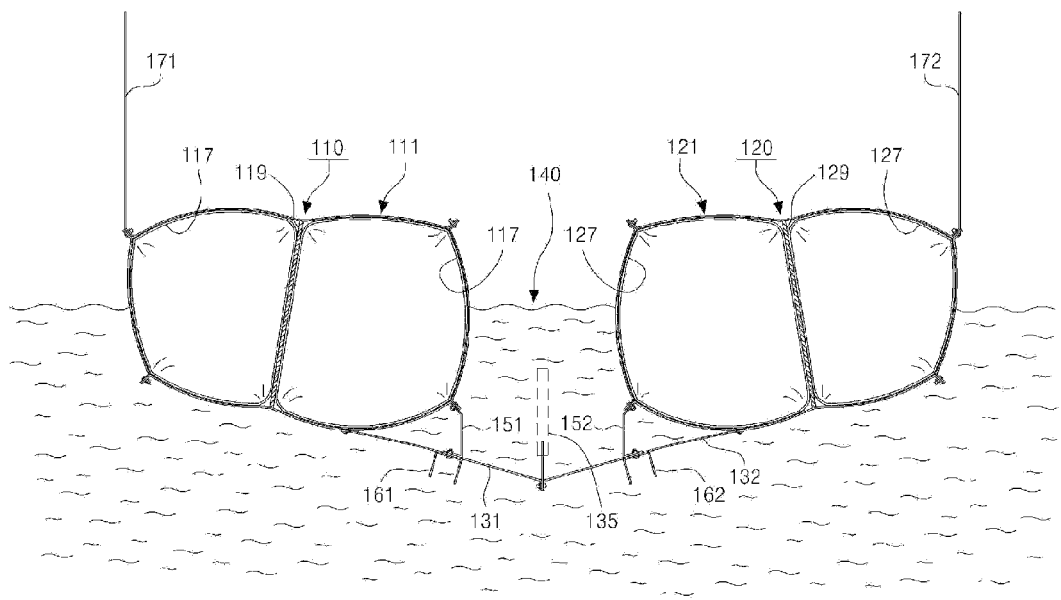
FIG. 4 is a schematic cross-sectional view taken along line A-A in FIG. 1 with the boat of FIG. 1 on water.
Figure 5:
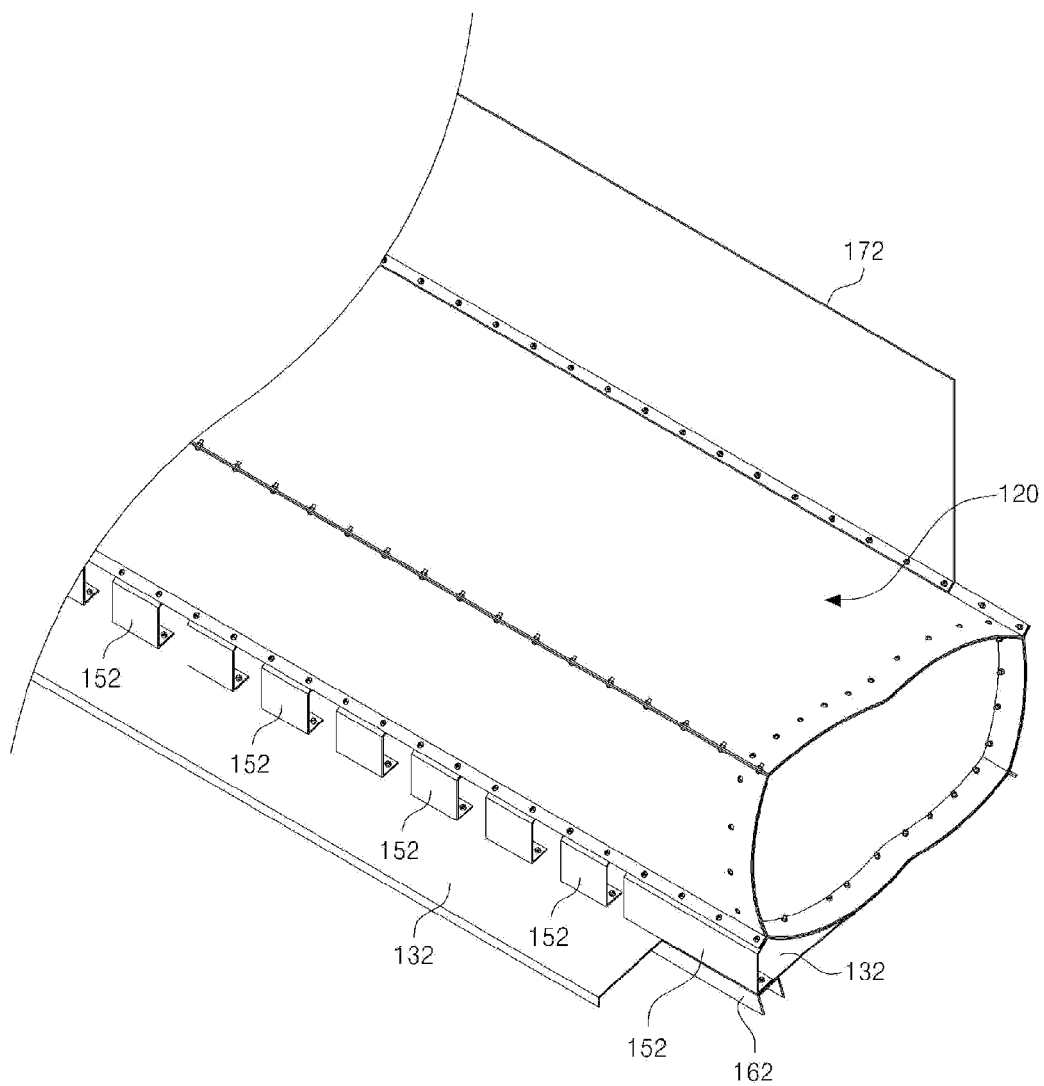
FIG. 5 is a partial perspective view illustrating a reinforcing frame of the boat of FIG. 1.

FIG. 1 is a perspective view illustrating a boat having a buoyancy unit according to an embodiment of the present invention, FIG. 2 is a partial perspective view of the boat of FIG. 1 shown in another direction, FIG. 3 is a rear view of the boat of FIG. 1, FIG. 4 is a schematic cross-sectional view taken along line A-A in FIG. 1 with the boat of FIG. 1 on water, and FIG. 5 is a partial perspective view illustrating a reinforcing frame of the boat of FIG. 1.

Referring to FIGS. 1 to 5, a boat 100 having a buoyancy unit according to the present invention (hereafter, referred to as a 'boat') may include a pair of buoyancy units 110 and 120, a bottom plate structure 130, a water storage 140, a reinforcing frame 150, and a running frame 160. The term 'boat' used herein is not limited to boats for leisure and has a meaning that includes various boats or ships such as a fishing boat and a merchant ship.

The pair of buoyancy units 110 and 120 may be arranged in parallel away from each other, as illustrated in FIGS. 1 to 5. That is, the pair of buoyancy units 110 and 120 may be arranged in parallel with each other with a predetermined lateral gap. The buoyancy units 110 and 120, as the meaning of the term, are parts for providing stable buoyancy to enable the boat 100 to float on water. For the convenience of description, the buoyancy unit 110 at the left in FIG. 3 is referred to as a 'first buoyancy unit' and the buoyancy unit 120 at the right in FIG. 2 is referred to as a 'second buoyancy unit'. The first buoyancy unit 110 and the second buoyancy unit 120 have substantially the same shape, except that they may be symmetrically disposed at the left and right sides, as illustrated in FIG. 3.

The buoyancy units 110 and 120, as illustrated in FIGS. 1 to 5, may include, respectively, reinforcing cases 111 and 121 with a space therein and tubes 117 and 127 that are disposed in the reinforcing cases 111 and 121 and can be filled with a gas. The reinforcing cases 111 and 121 are harder than the tubes 117 and 127 that are soft.

The reinforcing cases 111 and 121 are provided to protect the tubes 117 and 127 therein from an external shock and to enhance the entire structural strength of the buoyancy units 110 and 120. The reinforcing cases 111 and 121 are made of preferably plastic and more preferably engineering plastic for reducing the weight of the boat 100, but, alternatively, they may be made of metal such as stainless steel (SUS).

The tubes 117 and 127 are disposed in the reinforcing cases 111 and 121 and generate main buoyancy of the buoyancy units 110 and 120 by expanding when a gas is injected. Although two tubes 117 and 127 are provided for each of the buoyancy units 110 and 120, respectively, in the accompanying drawings, the present invention is not limited thereto and one, or three or more tubes 117 and 127 may be provided for each of the buoyancy units 110 and 120.

On the other hand, separators 119 and 129, which divide the inside of the reinforcing cases 111 and 121 into several sections and support the tubes 117 and 127 to prevent the them from moving out of their predetermined positions in expansion, may be disposed in the reinforcing cases 111 and 121, as illustrated in FIG. 4. The upper ends of the lower ends of the separators 119 and 129 may be fastened and fixed to the reinforcing cases 111 and 121 by riveting or bolting.

Figure 6:
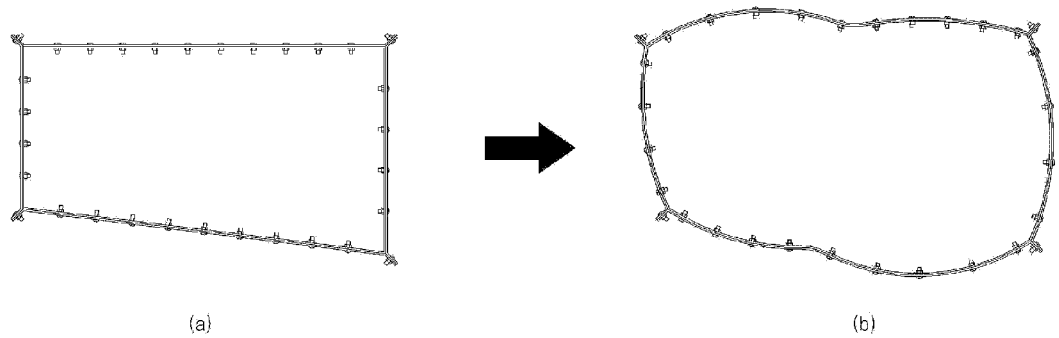
FIG. 6 is a schematic view illustrating deformation of a reinforcing case due to expansion of a tube of the buoyancy unit illustrated in FIG. 1.

On the other hand, FIG. 6 is a schematic view illustrating deformation of a reinforcing case due to expansion of a tube in the buoyancy unit illustrated in FIG. 1. FIG. 6(a) illustrates the shape of a reinforcing case when a gas is not injected in a tube and FIG. 6(b) illustrates the shape of the reinforcing case when a gas finishes being injected in a tube.

The reinforcing cases 111 and 121, as illustrated in FIGS. 1 to 6, may be assembled by combining top plates 112 and 122, left plates 113 and 123, right plates 114 and 124, and bottom plates 115 and 125. The reinforcing cases 111 and 121, as illustrated in FIG. 6(a), preferably have a substantially rectangular cross-section when a gas is not injected in the tubes 117 and 127 and this is because they can exhibit buoyancy ability larger than those of reinforcing cases having an elliptical or circular cross-section under the same conditions. It is more preferable for the reinforcing cases 111 and 121 that when a gas is not injected in the tubes 117 and 127, the top plates 112 and 122 are arranged substantially horizontally and the bottom plates 115 and 125 decline toward the center of the boat 100, for example, the reinforcing cases 111 and 121 have a trapezoidal cross-section, as illustrated in FIG. 6(a), in order to increase the ability of running straight and cornering by making the bottom of the boat 100 as in a V-shape as possible and to enable passengers to conveniently and safely act on the boat 100 by making the bottom of the passenger's section flat. Meanwhile, as a gas is injected to the tubes 117 and 127, the reinforcing cases 111 and 121 may be deformed in an outward convex shape, as illustrated in FIG. 6(b), expanding with the tubes 117 and 127. In this state, the inner sides of the reinforcing cases 111 and 121 keep pressed by the expanding tubes 117 and 127, so the entire structural strength of the buoyancy units 110 and 120 can be improved. Considering such deformation of the reinforcing cases 111 and 121, it is preferable that the bottom plate structure 130 is coupled to the bottoms of the reinforcing cases 111 and 121, after the reinforcing cases 111 and 121 are deformed in the outward convex shape. Due to the deformation of the reinforcing cases 111 and 121, the bottom plate structure 130 cannot be fully in close contact with the bottoms of the reinforcing cases 111 and 121 and, as illustrated in FIG. 3, predetermined spaces S may be defined between the bottoms of the buoyancy units 110 and 120 and the bottom plate structure 130.

On the other hand, in order to assemble the reinforcing cases 111 and 121, the top plates 112 and 122, the left plates 113 and 123, the right plates 114 and 124, and the bottom plates 115 and 125 may be fastened by various well-known methods, including riveting or bolting illustrated in the accompanying drawings. It is preferable that the top plates 112 and 122, the left plates 113 and 123, the right plates 114 and 124, and the bottom plates 115 and 125 have fastening portions 112a,122a,113a,123a,114a,124a,115a, and 125a, respectively, which are each curved at both sides outward from the reinforcing cases 111 and 121, as illustrated in FIGS. 2 to 4, because when the fastening portions 112a, 122a,113a,123a,114a,124a,115a, and 125a are formed only outside the reinforcing cases 111 and 121, they can improve convenient in fastening and increase the structural strength and combining strength of the reinforcing cases 111 and 121 without interfering with the tubes 117 and 127 expanding in the reinforcing cases 111 and 121. Further, the reinforcing cases 111 and 121, as illustrated in FIGS. 2 and 3, may further include rear plates 116 and 126 disposed at the stern of the boat 100. The edges of the rear plates 116 and 126 are fastened to the top plates 112 and 122, the left plates 113 and 123, the right plates 114 and 124, and the bottom plates 115 and 125 by bolting, and to this end, the rear plates 116 and 126 may have fastening portions 116 and 126 curved at the edges outward from the reinforcing cases 111 and 121.

However, in spite of those advantages, the cross-sectional shape and the assembly structure of the reinforcing cases 111 and 121 are not limited to those proposed in this embodiment and may be appropriately modified. For example, the reinforcing cases 111 and 121 may be manufactured not by combining the top plates 112 and 122, the left plates 113 and 123, the right plates 114 and 124, and the bottom plates 115 and 125, but by injection molding in a signal unit.

Further, although the tubes 117 and 127 are proposed as buoyancy members disposed in the reinforcing cases 111 and 121 in this embodiment, the present invention is not limited thereto and the reinforcing cases 111 and 121 may be filled with, instead of the tubes 117 and 127, a plurality of solid buoyancy blocks (not illustrated) made of Styrofoam (foamed polystyrene) and polyethylene foam, which are generally used for the buoyancy members in life jackets, or a plurality of air-containing capsules (not illustrated) sealed with a gas therein. For reference, the air-containing capsules may be made of at least one of thermoplastic materials such as EVA (Ethylene Vinyl Acetate), PE (Poly Ethylene), PET (Poly Ethylene Terephthalate), that is, they may be manufactured by forming synthetic resin into a shape with a sealed internal space through blow molding or injection molding, and then injecting a gas into the internal spaces and sealing them.

The bottom plate structure 130 can connect the bottoms of the pair of buoyancy units 110 and 120, as illustrated in FIGS. 1 to 5. The bottom plate structure 130 forms the bottom of the boat 100 in cooperation with the bottoms of the pair of buoyancy units 110 and 120 and enables the boat 100 to stably run. To this end, the bottom plate structure 130 may have a structure with both sides declining toward the center, as illustrated in FIGS. 3 and 4. That is, the bottom plate structure 130 may be a shape curved downward at the center between the pair of buoyancy units 110 and 120, for example, an entirely substantially V-shaped cross-section.

In this embodiment, the bottom plate structure 130 has a structure formed by combining two plates, that is, the bottom plate structure 130 may include a first bottom plate 131 with one end 131a fastened to the bottom of the first buoyancy unit 110 at the left side of the pair of buoyancy units 110 and 120 and a second bottom plate 132 with one end 132a fastened to the bottom of the second buoyancy unit 120 at the right side of the pair of buoyancy units 110 and 120. Further, the other end 131b of the first bottom plate 131 and the other end 132b of the second bottom plate 132 may be, as illustrated in FIGS. 3 and 4, curved outward from the center of the bottom plate structure 130 and fastened to each other. The bottom plate structure 130, as illustrated in FIGS. 1 to 5, may further include a keel plate 135 disposed between the first bottom plate 131 and the second bottom plate 132 and extending from the bow to the stern of the boat 100. The combination between the first and second bottom plates 131 and 132 and the buoyancy units 110 and 120 and the combination between the first bottom plate 131 and the second bottom plate 132 with the keel plate 135 therebetween may be achieved by various well-known methods, including riveting or bolting schematically illustrated in figures.

However, the bottom plate structure 130 is not limited to the shape and structure illustrated in the accompanying drawings of the present specification and may be appropriately changed in various other shapes and structures for connecting the bottoms of the pair of buoyancy units 110 and 120. For example, the bottom plate structure 130 may have not the structure formed by combining two plates 131 and 132, but a structure formed by one plate having a substantially V-shaped cross-section. Further, the bottom plate structure 130 may be one flat plate horizontally connecting the bottoms of the pair of buoyancy units 110 and 120. Further, unlike this embodiment in which the bottom plate structure 130 has a size corresponding to the gap between the pair of buoyancy units 110 and 120, may cover the entire bottoms of the pair of buoyancy units 110 and 120.

On the other hand, the bottom plate structure 130 may be made of engineering plastic or metal such as stainless steel (SUS). For reference, it may be preferable that the bottom plate structure 130 is made of engineering plastic for small boats such as boats for leisure and it may be preferable that the bottom plate structure 130 is made of metal for relatively large boats such as fishing boats.

As described above, since the bottoms of the pair of buoyancy units 110 and 120 spaced from each other are connected by the bottom plate structure 130 and the bottom plate structure 130 forms the bottoms of the pair of buoyancy units 110 and 120 and the bottom of the boat 100, the boat 100 according to the present invention can travel with the structure like a monohull, keeping the advantage of a catamaran that the center of buoyancy is steady, so the running ability can be improved. In detail, since the center of buoyancy of the boat 100 according to the present invention is divided to the two buoyancy units 110 and 120, the balance can keep stable, such that the concern of capsize reduces. Further, unlike common catamarans of which the area coming in contact with water is limited to the area of buoyancy units (hulls), the area coming in contact with water is increased by the bottom plate structure 130 forming the bottom of the boat 100 by connecting the bottoms of the pair of buoyancy units 110 and 120, so the running area is increased at an equivalent level to monohulls, and thus the running ability or the traveling efficiency can be maximized.

The water storage 140, which is defined by the pair of buoyancy units 110 and 120 and the bottom plate structure 130, as illustrated in FIGS. 1 to 5, is open rearward at the stern to take water from the outside and can temporarily keep the water. In other words, the water storage 140, which is a space defined by the pair of buoyancy units 110 and 120 and the bottom plate structure 130, is open rearward at the stern of the boats and can be filled with water from the outside. In another point of view, the bottom plate structure 130 connects the bottoms of the pair of the pair of buoyancy units 110 and 120 to define the water storage 140 that temporarily keeps water from the outside, between the pair of buoyancy units 110 and 120.

According to this configuration, the water storage 140 can temporarily keep water flowing inside through the stern of the boat 100 on water. In detail, the water storage 140 may be filled with water from the outside at a predetermined height, when the boat 100 stops, and the water in the water storage 140 may be automatically discharged to the outside, when the boat 100 is traveling.

As described above, when the boat 100 stops, the water in the water storage 140 increases the weight of the boat 100 at the center area in the lower portion of the boat 100, so the boat 100 can keep the center of gravity stable. In other words, the boat 100 holds a predetermined amount of water having predetermined weight at the center area in the lower portion by means of the water storage 140, when it stops, so it can keep the balance more stable. Accordingly, the boat 100 can reduce roll that is an up-down swing of the sides by waves or wind and pitch that is an up-down swing of the bow and the stern. Further, when the boat 100 is traveling, the water in the water storage 140 is automatically discharged outside, the running ability of the traveling efficiency of the boat 100 is not limited and it can be free from the common waterproof problem.

Further, the gap between a pair of buoyancy units (hulls) of common catamarans should be set to a predetermined length to prevent interference with the currents generated by the hulls, because when the gap between the hulls is small, the traveling efficiency of the boat decreases due to interference with the currents generated by the hulls at the middle area and the level of water is increased and the water may overflow the hulls, such that it is required to waterproof the deck. However, when the boat 100 according to the present invention starts to travel, the water in the water storage 140 defined by the bottom plate structure 130 connecting the bottoms of the pair of buoyancy units 110 and 120 is automatically discharged outside and the bottom plate structure 130 can slide on the water, such that there is the advantage that the same traveling features as those of a monohull can be achieved, even if the gap between the pair of buoyancy units 110 and 120, that is the gap between hulls is small.

Figure 7:
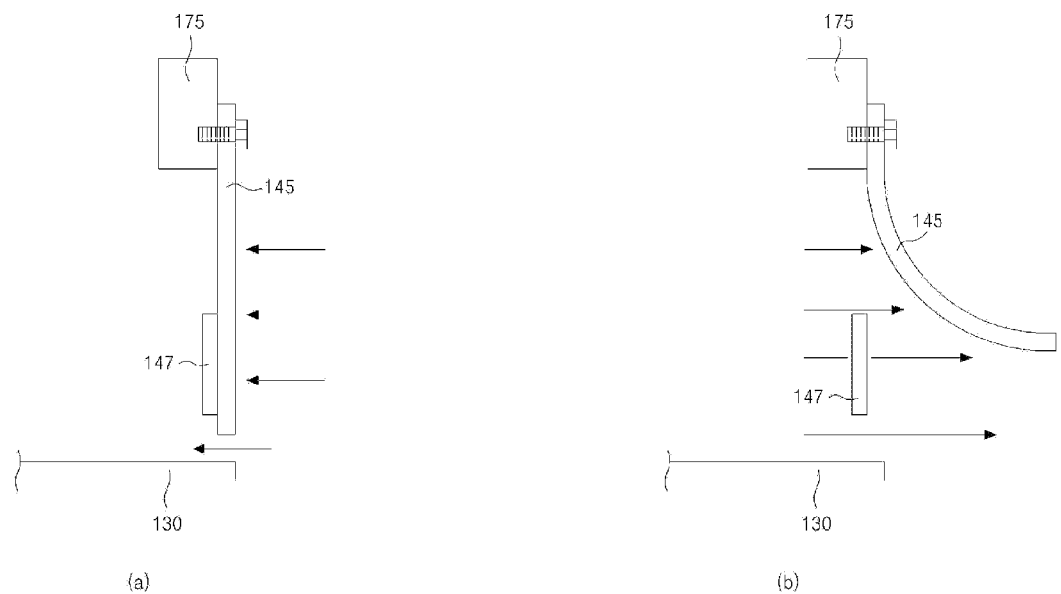
FIG. 7 is a schematic view illustrating the operation principle of a unilateral water shield of the boat illustrated in FIG. 1.

On the other hand, FIG. 7 is a schematic view illustrating the operation principle of a unilateral water shield of the boat illustrated in FIG. 1.

Referring to FIGS. 1 to 5, and 7, the boat 100 according to the present invention may further include an unilateral water shield 145. The unilateral water shield 145 has a structure that covers a portion of the rear-open area of the water storage 140 at the stern of the boat 100 and opens when the water in the water storage 140 is discharged outside. For example, the unilateral water shield 145 may be made of a flexible material with a thickness such that it can be bent by water discharged out of the water storage 140, in a plate shape corresponding to the cross-section of the water storage 140, as illustrated in the figures. The upper end of the unilateral water shield 145 may be fastened and fixed to a transom structure 175 by a bolt, as illustrated in FIGS. 3 and 7.

The unilateral water shield 145, as illustrated in FIG. 7(a), is restricted and not opened in the inflow direction of water into the water storage 140 by stopper 147, so it can prevent water from flowing too much into the water storage 140, when the boat 100 moves backward. Further, the unilateral water shield 145, as illustrated in FIG. 7(b), can open in the outflow direction of water from the water storage 140, so it does not interfere with the water discharged out of the water storage 140, when the boat 100 travels forward. It is preferable that the unilateral water shield 145 is made of a material with a thickness that can be bent well, as the water is discharged out of the water storage 140, as illustrated in FIG. 7(b).

On the other hand, the stopper 147, which is a bar-shaped member, as illustrated in FIGS. 3 and 7, is disposed close to the unilateral water shield 145, at the water storage 140 and may be fixed and supported by the keel plate 135 of the bottom plate structure 130. However, the unilateral water shield 145 of the present invention is not limited to the configuration proposed in this embodiment and may be implemented in various other configurations. For example, the unilateral water shield 145 may operate like a hinge.

The reinforcing frame 150, as illustrated in FIGS. 1 to 5, is disposed in the space between the buoyancy units 110 and 120 and the bottom plate structure 130 and can support the bottom plate structure 130 to the buoyancy units 110 an 120 by connecting the buoyancy units 110 an 120 and the bottom plate structure 130 to each other. In detail, the reinforcing frame 150 may include a first reinforcing frame 151 of which one end 151a is coupled to the bottom of the first buoyancy unit 110 at the left side of the pair of buoyancy units 110 an 120 and the other end 151b is coupled to the left part of the bottom plate structure 130 (a portion of the first bottom plate 131) and a second reinforcing frame 152 of which one end 152a is coupled to the bottom of the second buoyancy unit 120 at the right side of the pair of buoyancy units 110 an 120 and the other end 152b is coupled to the right part of the bottom plate structure 130 (a portion of the second bottom plate 132). The combination between the first and second reinforcing plates 151 and 152 and the buoyancy units 110 and 120 and the combination between the first and second reinforcing plates 151 and 152 and the bottom plate structure 130 may be achieved by various well-known fastening methods, including riveting or bolting schematically illustrated in figures.

On the other hand, it is preferable for the first and second reinforcing frames 151 and 152 that one ends 151a and 152a coupled to the buoyancy units 110 and 120 and the other ends 151b and 152b coupled to the bottom plate structure 130 are curved, as illustrated in FIGS. 2 to 5, in order to improve convenience in fastening in addition to increasing the structural strength and combining strength. Further, it is preferable that the first and second reinforcing frames 151 and 152 are each composed of a plurality of unit frames spaced from each other by extending from the bow to the stern of the boat in the longitudinal direction of the boat 100, that is, between the stern to the bow, as illustrated in FIG. 5.

The reinforcing frame 150 having this configuration enhances or improves the structural strength of the bottom plate structure 130. In detail, as illustrated in FIG. 3, predetermined spaces S may be defined by deformation of the reinforcing cases 111 and 121 of the buoyancy units 110 and 120 between the buoyancy units 110 and 120 and the bottom plate structure 130 and the structural strength of the bottom plate structure 130 may be considerably decreased by the spaces. Accordingly, the bottom plate structure 130 repeats bending deforming while the boat 100 travels and it may detract from the stability in traveling of the boat 100. In particular, this problem becomes worse when the bottom plate structure 130 is made of a thin material such as plastic for reducing the weight of the boat 100, similar to the buoyancy units 110 and 120 and the reinforcing cases 111 and 121. That is, in the present invention, the reinforcing frame 150 is provided to improve the problem of small structural strength of the bottom plate structure 130 by supporting the bottom plate structure 130 to the buoyancy units 110 and 120, by connecting the buoyancy units 110 and 120 with the bottom plate structure 130 in the spaces defined between the buoyancy units 110 and 120 and the bottom plate structure 130.

The running frame 160, as illustrated in FIGS. 1 to 5, is elongated in the longitudinal direction of the boat 100 and may be coupled to the bottom of the bottom plate structure by riveting or bolting. The running frame 160 improves the running ability of the boat 100 by holding the water sliding on the bottom of the boat 100, when the boat 100 travels. In detail, the running frame 160 may include a first running frame 161 coupled to the left part of the bottom plate structure 130 (a portion of the first bottom plate 131) and a second running frame 162 coupled to the right part of the bottom plate structure 130 (a portion of the second bottom plate 132). It is preferable that the first and second running frames 161 and 162, as illustrated in FIGS. 2 and 3, have a ⊓-shape.

Referring to FIGS. 1 to 5, the boat 100 according to the present invention may further include side plate structures 171 and 172, the transom structure 175, and a bow structure 179.

The side plate structures 171 and 172, as illustrated in FIGS. 1 to 5, may include a first side plate 171 on the first buoyancy unit 110 and a second side plate 172 on the second buoyancy unit 120. The side plate structures 171 and 172 can provide a passenger's section where passengers can act with safety by having a predetermined height along the outer edges of the buoyancy units 110 and 120. The side plate structures 171 and 172 are not limited to the shape and structure illustrated in the figures and may be appropriately modified in various shapes.

The transom structure 175 may be laterally disposed over the pair of buoyancy units 110 and 120, at the stern of the boat 100. The transom structure 175 is a member for providing a space where a driving engine or an outboard motor is installed. The shape and structure of the transom structure 175 illustrated in the accompanying drawings are just examples and the transom structure 175 may be modified in various shapes.

The bow structure 179 provides the bow of the boat 100, as the name is, and cleaves water when the boat 100 travels. Further, the bow structure 179 can contribute to improving stability of the boat 100 traveling, by increasing the total length of the boat 100. The bow structure 179 may be separately manufactured and then combined with the buoyancy units 110 and 120 and the side plate structures 151 and 152. Further, the bow structure 179 may be detachably provided, that is, it may be separated from the pair of buoyancy units 110 and 120, in which a waterproof problem due to the detachable structure of the bow structure 179 can be removed by the effect of the water storage 140 described above. Unlikely, the bow structure 179 may be formed integrally with the side plate structures 171 and 172. The bow structure 179 is not limited to the shape and structure illustrated in the figures and may be appropriately modified in various shapes.

It is apparent to those skilled in the art that the present invention is not limited to the embodiments described above and may be changed and modified in various ways without departing from the spirit and the scope of the present invention. Accordingly, the changed and modified examples should be construed as being included in claims of the present invention. For example, although the embodiments were described in relation only to a boat with a pair of buoyancy units, it should be understood that the present invention may be applied to a boat with three or more buoyancy units.

The present invention can be used for the field of water transportation devices, including a boat.

The invention claimed is:

1. A boat comprising:
   a pair of buoyancy units spaced from each other;
   a bottom plate structure connecting the bottoms of the pair of buoyancy units to each other;
   a water storage defined by the pair of buoyancy units and the bottom plate structure, open rearward at the stern to take water from the outside, and keeping the water flowing therein; and
   a reinforcing frame that supports the bottom plate structure to the buoyancy units by connecting the buoyancy units and the bottom plate structure to each other, in the space defined between the buoyancy units and the bottom plate structure.

2. The boat of claim 1, wherein the water storage is filled with water from the outside, when the boat stops, and the water in the water storage is discharged outside when the boat travels.

3. The boat of claim 2, further comprising a unilateral water shield that covers a portion of rear-open area of the water storage, and opens when the water in the water storage is discharged to the outside.

4. The boat of claim 1, wherein the bottom plate structure has a structure declining toward the center at both sides.

5. The boat of claim 4, wherein the bottom plate structure includes a first bottom plate of which one end is coupled to the bottom of any one of the pair of buoyancy units and a second bottom plate of which one end is coupled to the bottom of the other one of the pair of buoyancy units, and
   the other end of the first bottom plate and the other end of the second bottom plate are bent at the center of the bottom plate structure and fastened to each other.

6. The boat of claim 5, further comprising a keel plate disposed between the first bottom plate and the second bottom plate and extending from the bow to the stern of the boat.

7. The boat of claim 1, wherein the reinforcing frame includes:
   a first reinforcing frame of which one end is coupled to the bottom of any one of the pair of buoyancy units and the other end is coupled to the left part of the bottom plate structure; and
   a second reinforcing frame of which one end is coupled to the bottom of the other one of the pair of buoyancy units and the other end is coupled to the right part of the bottom plate structure.

8. The boat of claim 7, wherein in each of the first and second reinforcing frames, one end coupled to the buoyancy unit and the other end coupled to the bottom plate structure are bent.

9. The boat of claim 7, wherein the first and second reinforcing frames are each composed of a plurality of unit frames spaced from each other in the longitudinal direction of the boat.

10. A pair of buoyancy units spaced from each other;
a bottom plate structure connecting the bottoms of the pair of buoyancy units to each other:
a water storage defined by the pair of buoyancy units and the bottom plate structure, open rearward at the stern to take water from the outside, and keeping the water flowing therein; and
at least one running frame that is coupled to the bottom of the bottom plate structure and improves a running ability by extending in the longitudinal direction of the boat.

11. The boat of claim 10, wherein the running frame has a ⊓-shaped cross-section.

12. A boat comprising:
a pair of buoyancy units spaced from each other;
a bottom plate structure connecting the bottoms of the pair of buoyancy units to each other; and
a water storage defined by the pair of buoyancy units and the bottom plate structure, open rearward at the stern to take water from the outside, and keeping the water flowing therein,
wherein the buoyancy unit includes: a reinforcing case having an internal space; and at least one tube disposed in the reinforcing case and pressing the inner side of the reinforcing case when a gas is injected,
wherein the reinforcing case deforms in an outward convex shape by expanding with the tube, as a gas is injected into the tube.

13. The boat of claim 12, wherein the reinforcing case is formed by combining a top plate, a left plate, a right plate, and a bottom plate.

14. The boat of claim 13, wherein the top plate, the left plate, the right plate, and the bottom plate each have fastening portions at both sides which are bent outward from the reinforcing case.

15. The boat of claim 13, wherein when a gas is not injected in the tube, the top plate is substantially horizontally arranged and the bottom plate is disposed at an angle downward toward the center of the boat.

16. The boat of claim 12, wherein the bottom plate structure is coupled to the bottom of the reinforcing case, after the reinforcing case deforms in the outward convex shape.

17. The boat of claim 1, further comprising a bow structure detachably combined with the pair of buoyancy units.

* * * * *